United States Patent
Kim et al.

(10) Patent No.: US 9,846,312 B2
(45) Date of Patent: Dec. 19, 2017

(54) POLARIZING MASK AND MANUFACTURING METHOD UTILIZING THE POLARIZING MASK

(71) Applicant: LG CHEM, LTD., Seoul (KR)

(72) Inventors: Sin Young Kim, Daejeon (KR); Moon Soo Park, Daejeon (KR); Bu Gon Shin, Daejeon (KR); Hyuk Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 5 days.

(21) Appl. No.: 14/648,884

(22) PCT Filed: Dec. 31, 2013

(86) PCT No.: PCT/KR2013/012420
§ 371 (c)(1),
(2) Date: Jun. 1, 2015

(87) PCT Pub. No.: WO2014/104863
PCT Pub. Date: Jul. 3, 2014

(65) Prior Publication Data
US 2015/0301250 A1    Oct. 22, 2015

(30) Foreign Application Priority Data

Dec. 31, 2012  (KR) .......... 10-2012-0158197
Dec. 31, 2012  (KR) .......... 10-2012-0158198
(Continued)

(51) Int. Cl.
*G02B 27/28*   (2006.01)
*G02B 5/30*    (2006.01)
(Continued)

(52) U.S. Cl.
CPC .......... *G02B 27/281* (2013.01); *B01J 19/12* (2013.01); *G02B 1/02* (2013.01); *G02B 1/12* (2013.01);
(Continued)

(58) Field of Classification Search
CPC ..... G02F 2001/133538; G02F 2413/09; G02F 1/133538; G02B 27/281; G02B 5/3025;
(Continued)

(56) References Cited

U.S. PATENT DOCUMENTS 5,707,566 A    1/1998  Shen et al.
7,162,136 B1 * 1/2007  Pertl ...................... G01J 1/04
                                                  385/11
(Continued)

FOREIGN PATENT DOCUMENTS

CN    1716055 A    6/2005
EP    0664495 A1   7/1995
(Continued)

OTHER PUBLICATIONS

Machine translation of WO 2012044077 A2 retreived electronically from WIPO, Sep. 29, 2016.*
(Continued)

*Primary Examiner* — Thomas K Pham
*Assistant Examiner* — Cara Rakowski
(74) *Attorney, Agent, or Firm* — Dentons US LLP

(57) ABSTRACT

A polarizing mask and an apparatus and method for manufacturing an optical device are provided. The polarizing mask capable of being used to manufacture the optical device including an optical layer whose optical axes or light absorption axes are shifted continuously is provided. The optical device manufactured thus can be used to adjust characteristics of light in electronic devices such as display devices, or can be used for various applications requiring a (Continued)

continuous change in an optical axis or light absorption axis, including use of windows or shades of buildings or automobiles.

13 Claims, 13 Drawing Sheets

(30) Foreign Application Priority Data

Dec. 31, 2013 (KR) .................. 10-2013-0168248
Dec. 31, 2013 (KR) .................. 10-2013-0168270

(51) Int. Cl.
  *G02B 1/12* (2006.01)
  *B01J 19/12* (2006.01)
  *G02B 1/02* (2006.01)

(52) U.S. Cl.
  CPC ......... *G02B 5/3016* (2013.01); *G02B 5/3025* (2013.01)

(58) Field of Classification Search
  CPC ... G02B 5/3075; G02B 5/3016; G02B 27/288
  See application file for complete search history.

(56) References Cited

U.S. PATENT DOCUMENTS

| | | | |
|---|---|---|---|
| 2006/0001798 A1 | 1/2006 | Jang et al. | |
| 2011/0043731 A1* | 2/2011 | Shin .................. | G02F 1/133711 349/96 |
| 2011/0242478 A1 | 10/2011 | Yakushiji et al. | |
| 2012/0169950 A1 | 7/2012 | Tatzel et al. | |

FOREIGN PATENT DOCUMENTS

| | | |
|---|---|---|
| JP | 2006-003479 A | 1/2006 |
| JP | 2006-018285 A | 1/2006 |
| JP | 2006195395 A | 7/2006 |
| JP | 2010-156720 A | 7/2010 |
| KR | 10-0364504 B1 | 11/2002 |
| KR | 10-2005-0000572 A | 1/2005 |
| KR | 10-2006-0001291 A | 1/2006 |
| KR | 10-2008-0077975 A | 8/2008 |
| KR | 10-2012-0008678 A | 2/2012 |
| KR | 10-2012-0069298 A | 6/2012 |
| TW | 200520990 A | 7/2005 |
| TW | M440900 U1 | 11/2012 |
| TW | 201248202 A | 12/2012 |
| WO | 2010/070772 A1 | 6/2010 |
| WO | 2012/044077 A2 | 4/2012 |
| WO | 2012/092443 A2 | 7/2012 |

OTHER PUBLICATIONS

Seiberle, et al.: "Photo-aligned anisotropic optical thin film", Journal of the Society for Information Display (SID), vol. 12, No. 1, Jan. 1, 2014, pp. 87-92.

Viswwanathan et al.—"A Detailed Investigation of the Polarization Dependent Surface-Relief-Grating Formation Process on Azo Polymer Film", Jpn. J. Appl. Phys. vol. 38 (1999) pp. 5928-5937; Part 1, No. 10, Oct. 1999.

Office Action of Chinese Patent Office in Appl'No. 201380068569.5, dated May 18, 2017.

* cited by examiner

Fig. 7

| 101 | 102 | 103 | 104 | 105 |
|---|---|---|---|---|
| 1011 | 2011 | 3011 | 4011 | 5011 |
| 1012 | 2012 | 3012 | 4012 | 5012 |
| 1013 | 2013 | 3013 | 4013 | 5013 |
| 1014 | 2014 | 3014 | 4014 | 5014 |
| 1015 | 2015 | 3015 | 4015 | 5015 |

Fig. 8

|     |     |     |     |     |
|-----|-----|-----|-----|-----|
| 101 | 102 | 103 | 104 | 105 |

| 0 | 0 | 0 | 22.5 | 22.5 |
|---|---|---|------|------|
| 0 | 0 | 22.5 | 0 | 22.5 |
| 0 | 22.5 | 0 | 22.5 | 22.5 |
| 0 | 0 | 22.5 | 0 | 22.5 |
| 0 | 0 | 0 | 22.5 | 22.5 |

Fig. 9

|  | A | B | C | D | E | F | G | H |
|---|---|---|---|---|---|---|---|---|
|  | 67.5 | 67.5 | 90 | 90 | 90 | 90 | 67.5 | 67.5 |
|  | 67.5 | 90 | 67.5 | 90 | 90 | 67.5 | 90 | 67.5 |
|  | 90 | 67.5 | 90 | 90 | 67.5 | 90 | 67.5 | 67.5 |
|  | 67.5 | 90 | 67.5 | 90 | 90 | 67.5 | 90 | 67.5 |
|  | 67.5 | 67.5 | 90 | 90 | 90 | 90 | 67.5 | 67.5 |

Fig. 11

| | | | | |
|---|---|---|---|---|
| 0 | 0 | 0 | 0 | 0 |
| 0 | 0 | 22.5 | 0 | 0 |
| 0 | 22.5 | 0 | 22.5 | 0 |
| 22.5 | 0 | 22.5 | 0 | 22.5 |
| 22.5 | 22.5 | 22.5 | 22.5 | 22.5 |
| 22.5 | 22.5 | 45 | 22.5 | 22.5 |
| 22.5 | 45 | 22.5 | 45 | 22.5 |
| 45 | 22.5 | 45 | 22.5 | 45 |
| 45 | 45 | 45 | 45 | 45 |
| 45 | 45 | 67.5 | 45 | 45 |
| 45 | 67.5 | 45 | 67.5 | 45 |
| 67.5 | 67.5 | 67.5 | 67.5 | 67.5 |
| 67.5 | 67.5 | 90 | 67.5 | 67.5 |
| 67.5 | 90 | 67.5 | 90 | 67.5 |
| 90 | 67.5 | 90 | 67.5 | 90 |
| 90 | 90 | 90 | 90 | 90 |

Fig. 12

| 90 | 90 | 67.5 | 90 | 90 |
|---|---|---|---|---|
| 90 | 67.5 | 90 | 67.5 | 90 |
| 67.5 | 90 | 67.5 | 90 | 67.5 |
| 67.5 | 67.5 | 67.5 | 67.5 | 67.5 |
| 67.5 | 67.5 | 45 | 67.5 | 67.5 |
| 67.5 | 45 | 67.5 | 45 | 67.5 |
| 45 | 67.5 | 45 | 67.5 | 45 |
| 45 | 45 | 45 | 45 | 45 |
| 45 | 45 | 22.5 | 45 | 45 |
| 45 | 22.5 | 45 | 22.5 | 45 |
| 22.5 | 45 | 22.5 | 45 | 22.5 |
| 22.5 | 22.5 | 22.5 | 22.5 | 22.5 |
| 22.5 | 22.5 | 0 | 22.5 | 22.5 |
| 22.5 | 0 | 22.5 | 0 | 22.5 |
| 0 | 22.5 | 0 | 22.5 | 0 |
| 0 | 0 | 0 | 0 | 0 |

POLARIZING MASK AND MANUFACTURING METHOD UTILIZING THE POLARIZING MASK

This application is a National Stage Entry of International Application No. PCT/KR2013/012420, filed Dec. 31, 2013, and claims the priority to and benefit of Korean Patent Application Nos. 10-2012-0158198, filed Dec. 31, 2012, 10-2012-0158197, filed Dec. 31, 2012, 10-2013-0168248, filed Dec. 31, 2013, and 10-2013-0168270, filed Dec. 31, 2013, all of which are hereby incorporated by reference in their entirety for all purposes as if fully set forth herein.

FIELD

The present application relates to a polarizing mask, and an apparatus and method for manufacturing an optical device.

BACKGROUND

Optical devices such as retardation films or polarizing plates may be, for example, used to adjust characteristics of light in display devices, or used for various applications including windows or shades in buildings or automobiles.

Such optical devices include a film obtained by adsorbing and aligning a dichroic dye on a polymer film such as a poly(vinyl alcohol) (PVA) film, a film manufactured using a liquid crystal compound and a dichroic dye, a film endowed with optical anisotropy by means of elongation, or a film endowed with optical anisotropy using a liquid crystal compound, as known in the related art.

PRIOR-ART PATENT DOCUMENTS

Patent Document 1: Korean Unexamined Patent Application Publication No. 2008-0077975
Patent Document 2: Korean Patent No. 0364504
Patent Document 3: U.S. Pat. No. 5,707,566

DESCRIPTION

Object

The present application provides a polarizing mask, and an apparatus and method for manufacturing an optical device.

Solution

One aspect of the present application provides an optical device including an optical layer. In the present application, the term "optical layer" may include all kinds of layers formed to perform optically required functions, for example, retardation of a phase of incident light, or a change in state such as a polarization state.

The optical layer may include a region (hereinafter referred to as a shift region) in which the optical axis or light absorption axis is shifted in one direction. In the present application, the term "optical axis" may refer to a slow axis or a fast axis in an anisotropic region. A direction of the optical axis or the light absorption axis in the shift region of the optical layer may be continuously changed. The continuous change in direction of the optical axis or the light absorption axis may mean that an angle formed by the optical axis or the light absorption axis may increase or decrease in one direction.

FIG. 1 is a schematic diagram showing an upper shape of an illustrative optical layer. In FIG. 1, a double arrow represents the optical axis or light absorption axis of the optical layer. In FIG. 1, the angle formed by the optical axis or light absorption axis tends to increase in one direction (i.e., a direction spanning from the top to the bottom as shown in FIG. 1) as measured in a counterclockwise direction.

In the shift region, an average rate of change of the optical axis or light absorption axis may be determined by the following Equation 1.

$$V=360/P \quad \text{[Equation 1]}$$

In Equation 1, V represents an average rate of change, and P represents a pitch of the shift region.

In the present application, the term "pitch of a shift region" refers to a length measured in one direction, which is required to achieve 360 degrees rotation of the optical axis or light absorption axis in a shift region which is a region in which the angle formed by the optical axis or light absorption axis continues to increase or decrease in the one direction. Unless otherwise particularly defined in the present application, millimeters (mm) may be used as the unit of length. Therefore, the unit of the average rate of change V in Equation 1 may be degrees (degrees)/mm.

For example, FIG. 2 is a diagram showing a region in which the angle formed by the optical axis or light absorption axis continues to decrease in one direction (i.e., a direction spanning from the top to the bottom as shown in FIG. 2) as measured in a clockwise direction. In FIG. 2, a pitch of the region, that is, a distance measured in the one direction, which is required to achieve 360 degrees rotation of the optical axis or light absorption axis, is represented by P.

In one shift region, when 360 degrees rotation of the optical axis or light absorption axis is not achieved, the pitch may be calculated by applying an angle A and a length L of the shift region to the following Equation 2. Here, the angle A is formed by rotation of the optical axis or light absorption axis of an ending point of the shift region with respect to the optical axis or light absorption axis of a starting point of the shift region, as measured in one of clockwise and counterclockwise directions.

$$P=360 \times (L/A) \quad \text{[Equation 2]}$$

In Equation 2, P represents a pitch of a shift region, L represents a length of the shift region, and A represents an angle which is formed by rotation of the optical axis or light absorption axis of an ending point of the shift region with respect to the optical axis or light absorption axis of a starting point of the shift region, as measured in one of the clockwise and counterclockwise directions.

In the shift region, the average rate of change calculated in Equation 1 may be greater than 0 or less than or equal to 5. According to another illustrative embodiment, the average rate of change may be less than or equal to 4.5, 4.0, 3.5, 3.0, 2.5, 2.0, 1.5, 1.0, or 0.7. Also, the average rate of change may be greater than or equal to 0.1, 0.2, or 0.2. An optical layer may be designed to have the above-described average rate of change and thus obtain a device suitable for desired applications.

In the present application, the optical layer may be a single layer. In the present application, the term "single layer" is used to denote the concept of excluding layers formed by assembling or stacking two or more layers. For example, a layer formed by assembling at least two different layers having different optical axes or light absorption axes, or a layer formed using a method of stacking a polarizing layer and a retardation layer is excluded from the category of the single layer so as to form the optical axes or light absorption axes which are shifted continuously.

According to one illustrative embodiment, no interface may be observed between regions having different optical axes or light absorption axes in the shift region of the optical layer. That is, a change in an optical axis or light absorption axis may be substantially completely achieved continuously, and no domain may be observed in the optical layer.

For example, the expression "no interface is observed between the regions having different optical axes or light absorption axes in the shift region of the optical layer" may mean that the change in the optical axis or light absorption axis of the shift region satisfies the following Equation 3.

$$Y = a \times X \qquad \text{[Equation 3]}$$

In Equation 3, X represents a distance measured in one direction in which a change in an optical axis or light absorption axis takes place from a starting point of a shift region, Y represents an angle obtained by rotating the optical axis or light absorption axis on the point X measured with respect to the optical axis or light absorption axis of the starting point of the shift region, and a is an integer greater than 0 and less than or equal to 5.

In Equation 3, the rotation angle Y of the optical axis or light absorption axis is an angle measured in any one of clockwise and counterclockwise directions with respect to 0 degrees which is set as an angle of the optical axis or light absorption axis in the starting point of the shift region. In Equation 4, a may be less than or equal to 4.5, 4.0, 3.5, 3.0, 2.5, 2.0, 1.5, 1.0, or 0.7 in another illustrative embodiment. Also, a may be greater than or equal to 0.1, 0.2, or 0.2.

An optical device in which the change in the optical axis or light absorption axis satisfies Equation 3 and is continuously achieved to be suitable for desired applications may be provided.

The rotation angle of the shift region may be determined according to the following Equation 4.

$$\phi = V \times L \qquad \text{[Equation 4]}$$

In Equation 4, φ represents a rotation angle, V represents an average rate of change, and L represents a length of the shift region.

In Equation 4, the average rate of change V may be measured according to Equation 1.

A range of the rotation angle of the shift region may be determined in consideration of applications in which the optical device is used, and may be, for example, greater than or equal to approximately 10 degrees, 20 degrees, 30 degrees, 40 degrees, 50 degrees, 60 degrees, 70 degrees, 80 degrees, 90 degrees, 100 degrees, 110 degrees, 120 degrees, 130 degrees, 140 degrees, 150 degrees, 160 degrees, 170 degrees, 180 degrees, 190 degrees, 200 degrees, 210 degrees, 220 degrees, 230 degrees, 240 degrees, 250 degrees, 260 degrees, 270 degrees, 280 degrees, 290 degrees, 300 degrees, 310 degrees, 320 degrees, 330 degrees, 340 degrees, or 350 degrees, but the present application is not limited thereto. An upper limit of the rotation angle is also determined according to desired applications, and may be, for example, less than or equal to approximately 1,000 degrees, 900 degrees, or 800 degrees, but the present application is not limited thereto.

The optical layer of the optical device may be configured to include only one shift region as described above, or include two shift regions when necessary. Also, the optical layer of the optical device may be configured to include a region other than the shift region, for example, a region in which the optical axis or light absorption axis is uniformly formed in only one direction, or a region in which a change in the optical axis or light absorption axis is made discontinuously.

The optical layer may be a phase delay layer or a polarizing layer. When the optical layer is a phase delay layer, the optical layer may have the optical axis as described above. Also, when the optical layer is a polarizing layer, the optical layer may have the light absorption axis as described above.

A phase difference is not limited when the optical layer is the phase delay layer, or polarization efficiency is not limited when the optical layer is the polarizing layer. For example, the phase difference or polarization efficiency may be freely adjusted by selecting a proper source material in consideration of desired applications.

The optical layer may be a liquid crystal polymer layer. In the present application, the term "liquid crystal polymer layer" may refer to a layer formed by polymerizing a polymerizable liquid crystal compound (referred to as a reactive mesogen (RM)). For example, the liquid crystal polymer layer may be formed by polymerizing a polymerizable liquid crystal compound in a state in which the polymerizable liquid crystal compound is aligned on an alignment film to be described below. When necessary, the liquid crystal polymer layer may further include a known additional component, for example, a non-polymerizable liquid crystal compound, a polymeric amorphous compound, a non-polymeric amorphous compound, a surfactant, or a leveling agent.

The polymerizable liquid crystal compound used to form the liquid crystal polymer layer may be properly selected according to a purpose. For example, a compound having a smectic phase, a nematic phase or a cholesteric phase may be used as the liquid crystal compound.

An optical layer having a desired shape may be more effectively formed using the liquid crystal compound exhibiting such characteristics.

A polymerizable liquid crystal compound represented by the following Formula 1 may be, for example, used as the polymerizable liquid crystal compound.

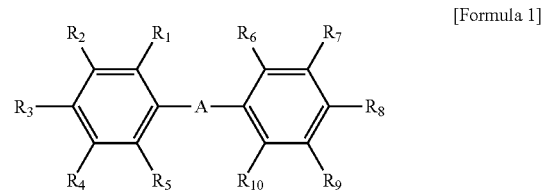

[Formula 1]

In Formula 1, A represents a single bond, —COO—, or —OCO—, and $R_1$ to $R_{10}$ are each independently hydrogen, a halogen, an alkyl group, an alkoxy group, an alkoxycarbonyl group, a cyano group, a nitro group, —O-Q-P or a substituent represented by the following Formula 2, or a pair of two adjacent substituents of $R_1$ to $R_5$ or a pair of two adjacent substituents of $R_6$ to $R_{10}$ are joined together to form a benzene ring substituted with —O-Q-P, provided that at least one of the substituents $R_1$ to $R_{10}$ is —O-Q-P or a substituent of the following Formula 2, or at least one of the pair of two adjacent substituents of $R_1$ to $R_5$ and the pair of two adjacent substituents of $R_6$ to $R_{10}$ are joined together to form a benzene ring substituted with —O-Q-P, wherein Q is an alkylene group or an alkylidene group, and P is a polymerizable functional group such as an alkenyl group, an epoxy group, a cyano group, a carboxyl group, an acryloyl group, a (meth)acryloyl group, an acryloyloxy group, or a (meth)acryloyloxy group.

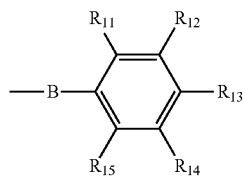

[Formula 2]

In Formula 2, B is a single bond, —COO— or —OCO—, and $R_{11}$ to $R_{15}$ are each independently hydrogen, a halogen, an alkyl group, an alkoxy group, an alkoxycarbonyl group, a cyano group, a nitro group or —O-Q-P, or a pair of two adjacent substituents of $R_{11}$ to $R_{15}$ are joined together to form a benzene ring substituted with —O-Q-P, provided that at least one of the substituents $R_{11}$ to $R_{15}$ is —O-Q-P, or a pair of two adjacent substituents of $R_{11}$ to $R_{15}$ are joined together to form a benzene ring substituted with —O-Q-P, wherein Q is an alkylene group or an alkylidene group, and P is a polymerizable functional group such as an alkenyl group, an epoxy group, a cyano group, a carboxyl group, an acryloyl group, a (meth)acryloyl group, an acryloyloxy group, or a (meth)acryloyloxy group.

In Formulas 1 and 2, the expression "two adjacent substituents are joined together to form a benzene ring substituted with —O-Q-P" may mean that the two adjacent substituents are joined together to form a naphthalene backbone substituted with —O-Q-P as a whole.

In Formula 2, "-" indicated on the left side of B may mean that B is directly bound to the benzene ring of Formula 1.

In Formulas 1 and 2, the term "single bond" means that no additional atoms are present in a moiety represented by A or B. For example, when A in Formula 1 is a single bond, the benzene rings disposed on both sides of A may be directly bound to form a biphenyl structure.

In Formulas 1 and 2, the halogen that may be used herein may, for example, include chlorine, bromine or iodine.

Unless particularly defined otherwise herein, the term "alkyl group" may, for example, refer to a linear or branched alkyl group having 1 to 20 carbon atoms, 1 to 16 carbon atoms, 1 to 12 carbon atoms, 1 to 8 carbon atoms, or 1 to 4 carbon atoms, or a cycloalkyl group having 3 to 20 carbon atoms, 3 to 16 carbon atoms, or 4 to 12 carbon atoms. The alkyl group may be optionally substituted with one or more substituents.

Unless particularly defined otherwise herein, the term "alkoxy group" may, for example, refer to an alkoxy group having 1 to 20 carbon atoms, 1 to 16 carbon atoms, 1 to 12 carbon atoms, 1 to 8 carbon atoms, or 1 to 4 carbon atoms. The alkoxy group may be linear, branched or cyclic. Also, the alkoxy group may be optionally substituted with one or more substituents.

Unless particularly defined otherwise herein, the term "alkylene group" or "alkylidene group" may, for example, refer to an alkylene or alkylidene group having 1 to 12 carbon atoms, 4 to 10 carbon atoms, or 6 to 9 carbon atoms.

The alkylene or alkylidene group may be, for example, linear, branched or cyclic. Also, the alkylene or alkylidene group may be optionally substituted with one or more substituents.

Unless particularly defined otherwise herein, the term "alkenyl group" may, for example, refer to an alkenyl group having 2 to 20 carbon atoms, 2 to 16 carbon atoms, 2 to 12 carbon atoms, 2 to 8 carbon atoms, or 2 to 4 carbon atoms. The alkenyl group may be, for example, linear, branched or cyclic. Also, the alkenyl group may be optionally substituted with one or more substituents.

In Formulas 1 and 2, P may, for example, be an acryloyl group, a (meth)acryloyl group, an acryloyloxy group, or a (meth)acryloyloxy group; an acryloyloxy group or a (meth)acryloyloxy group; or an acryloyloxy group.

In this specification, the substituent which may be substituted with a certain functional group may include an alkyl group, an alkoxy group, an alkenyl group, an epoxy group, an oxo group, an oxetanyl group, a thiol group, a cyano group, a carboxyl group, an acryloyl group, a (meth)acryloyl group, an acryloyloxy group, a (meth)acryloyloxy group or an aryl group, but the present application is not limited thereto.

The —O-Q-P which may be present in plural numbers in Formula 1 and 2 or the residue of Formula 2 may be, for example, present in a position of $R_3$, $R_8$ or $R_{13}$. For example, the substituents that may be joined together to form a benzene ring substituted with —O-Q-P may also be $R_3$ and $R_4$, or $R_{12}$ and $R_{13}$. In the compound of Formula 1 or the residue of Formula 2, the substituents other than the —O-Q-P or the residue of Formula 2, or the substituents other than those being joined together to form the benzene ring may be, for example, hydrogen, a halogen, a linear or branched alkyl group having 1 to 4 carbon atoms, an alkoxycarbonyl group containing a linear or branched alkoxy group having 1 to 4 carbon atoms, a cycloalkyl group having 4 to 12 carbon atoms, an alkoxy group having 1 to 4 carbon atoms, a cyano group, or a nitro group. According to another illustrative embodiment, the substituents or the residues may be chlorine, a linear or branched alkyl group having 1 to 4 carbon atoms, a cycloalkyl group having 4 to 12 carbon atoms, an alkoxy group having 1 to 4 carbon atoms, an alkoxycarbonyl group containing a linear or branched alkoxy group having 1 to 4 carbon atoms, or a cyano group.

The polymerizable liquid crystal compound which may also be represented by Formula 1 may, for example, include 1, 2 or more, 1 to 10, 1 to 8, 1 to 6, 1 to 5, 1 to 4, 1 to 3, or 1 to 2 polymerizable functional groups (P in Formula 1 or 2).

In the case of the polarizing layer, the optical layer may be a liquid crystal polymer layer including a dichroic dye, or a lyotropic liquid crystal (LLC) layer. For example, the optical layer may be formed by polymerizing a polymerizable liquid crystal compound in a state in which the polymerizable liquid crystal compound and a layer including a dichroic dye are aligned on an alignment film to be described below, or the above-described optical layer may be formed by applying a shear force to lyotropic liquid crystals in a desired direction to form a layer.

When the optical layer is a liquid crystal polymer layer including a dichroic dye, the kind of the polymerizable liquid crystal compound used to form the polymer layer may be properly selected in consideration of desired performance of the polarizing layer. For example, the above-described kind of the polymerizable liquid crystal compound may be used herein.

The liquid crystal polymer layer serving as the optical layer may include a dichroic dye. In the present application, the term "dye" may refer to a material which may intensively absorb and/or deform light within at least a partial or complete range of a visual light region, for example, wavelengths of 400 nm to 800 nm, and the term "dichroic dye" may refer to a material which may anisotropically absorb light within at least a partial or complete range of the visual light region. All kinds of dyes having the maximum absorbance in a range of a visual light region, for example, 400 nm to 800 nm, may be basically used as the dichroic dye. For example, such a dye includes an azo dye or an anthraquinone dye, as known in the related art. For example, an azo dye F355 (registered trademark), F357 (registered trademark) or F593 (registered trademark) (Nippon Kankoh Shikiso kenkyusho Ltd), or kinds of dyes known to exhibit substantially the same effects as the above-described azo dye may be used herein, but the present application is not limited thereto.

For example, all kinds of dyes known to be aligned along alignment of a liquid crystal compound while exhibiting the above-described characteristics may be used as the dichroic dye.

The optical device may further include a base layer. For example, the optical device further includes the base layer, and the optical layer may be configured to be formed on at least one surface of the base layer. When necessary, the optical layer may be formed on both surfaces of the base layer. FIG. 3 is a schematic diagram showing one illustrative embodiment of the optical device. Here, the optical device has a structure in which a base layer 10 and an optical layer 20 are sequentially formed.

The base layer may be formed of a known material without particular limitation. For example, an inorganic film such as a glass plate, a crystalline or amorphous silicon film, or a quartz or indium tin oxide (ITO) film, or a plastic film may be used as the base layer. An optically isotropic base layer or an optically anisotropic base layer may be used as the base layer.

A base layer including at least one selected from the group consisting of triacetyl cellulose (TAC); a cyclo-olefin copolymer (COP) such as a norbornene derivative; poly(methyl methacrylate) (PMMA); polycarbonate (PC); polyethylene (PE); polypropylene (PP); polyvinyl alcohol (PVA); diacetyl cellulose (DAC); polyacrylate (Pac); polyether sulfone (PES); polyetheretherketone (PEEK); polyphenylsulfone (PPS), polyetherimide (PEI); polyethylene naphthalate (PEN); polyethylene terephthalate (PET); polyimide (PI); polysulfone (PSF); polyacrylate (PAR), and an amorphous fluorine resin may be used as the plastic base layer, but the present application is not limited thereto. When necessary, a coating layer such as a coating layer formed of gold, silver, or a silicon compound such as silicon dioxide or silicon monoxide, or an anti-reflection layer may be present on the base layer.

The optical device may further include an alignment film. The alignment film may be formed in contact with the above-described optical layer. For example, when the optical device further includes a base layer, and an optical layer is formed on one surface of the base layer, the alignment film may be present between the base layer and the optical layer.

Any kinds of alignment films may be used as the alignment film as long as they can properly adjust alignment of an optical layer adjacent to the alignment film, for example, alignment of the above-described liquid crystal compound or the dichroic dye. For example, an optical alignment film may be used as the alignment film.

The alignment film may include an alignment compound, for example, a photo-alignment compound. In the present application, the term "photo-alignment compound" may refer to a compound which is oriented in a predetermined direction by irradiation with light and can align adjacent liquid crystal compounds in a predetermined direction with an oriented state. The alignment compound may be a single-molecule compound, a monomeric compound, an oligomeric compound, or a polymeric compound.

The photo-alignment compound may be a compound containing a photosensitive moiety. Various kinds of photo-alignment compounds that may be used for alignment of the liquid crystal compound are known in the related art. For example, a compound oriented by trans-cis photoisomerization; a compound oriented by photo-destruction such as chain scission or photo-oxidation; a compound oriented by photo-crosslinking or photo-polymerization such as [2+2] cycloaddition, [4+4] cycloaddition or photodimerization; a compound oriented by photo-Fries rearrangement; or a compound oriented by a ring opening/closure reaction may be, for example, used as the photo-alignment compound. For example, examples of the compound oriented by the trans-cis photoisomerization may include an azo compound such as a sulfonated diazo dye or an azo polymer, or a stilbene compound, and examples of the compound oriented by the photo-destruction may include cyclobutane tetracarboxylic dianhydride (cyclobutane-1,2,3,4-tetracarboxylic dianhydride), an aromatic polysilane or polyester, polystyrene, or polyimide. Also, examples of the compound oriented by the photo-crosslinking or photo-polymerization may include a cinnamate compound, a coumarin compound, a cinnamamide compound, a tetrahydrophthalimide compound, a maleimide compound, a benzophenone compound, a diphenylacetylene compound, a compound (hereinafter referred to as a chalcone compound) having a chalconyl moiety as a photosensitive moiety, or a compound (hereinafter referred to as an anthracenyl compound) having an anthracenyl moiety, examples of the compound oriented by the photo-Fries rearrangement may include aromatic compounds such as a benzoate compound, a benzoamide compound, a methacrylamidoaryl (meth)acrylate compound, and the like, and examples of the compound oriented by the ring opening/closure reaction may include a compound oriented by a ring opening/closure reaction of a [4+2] π-electronic system such as a spiropyran compound, etc., but the present application is not limited thereto.

The photo-alignment compound may be a single-molecule compound, a monomeric compound, an oligomeric compound or a polymeric compound, or may be a blend of the photo-alignment compound and a polymer. As such, the oligomeric or polymeric compound may have the moiety derived from the above-described photo-alignment compound or the above-described photosensitive moiety in a main chain or a side chain thereof.

Examples of the polymer which has the moiety derived from the photo-alignment compound or the photosensitive moiety or may be mixed with the photo-alignment compound may include a polynorbornene, a polyolefin, a polyacrylate, a polyacrylate, a poly(meth)acrylate, a polyimide, a poly(amic acid), a polymaleimide, a polyacrylamide, a polymethacrylamide, a polyvinyl ether, a polyvinyl ester, a polystyrene, a polysiloxane, a polyacrylonitrile, or a poly(methacrylonitrile), but the present application is not limited thereto.

Representative examples of the polymer which may be included in the alignment compound may include polynorbornene cinnamate, polynorbornene alkoxy cinnamate, polynorbornene allyloxyoxy cinnamate, polynorbornene-fluorinated cinnamate, polynorbornene-chlorinated cinnamate, or polynorbornene dicinnamate, but the present application is not limited thereto.

The kinds of the above-described compounds may be properly selected and used as the alignment compound. However, it is desirable to use an alignment compound having reversibility in order to properly induce the above-described continuous change in the optical axis or light absorption axis. In the present application, the expression "alignment compound having reversibility" may, for example, mean that an alignment compound has characteristics in which an orientation direction determined by alignment such as irradiation with linearly polarized light may be affected and shifted by additional alignment, for example, irradiation with linearly polarized light polarized in a different direction. That is, the optical device may be formed using the alignment film which is formed using a process of irradiating the same region with different kinds of linearly polarized light polarized in different directions several times, as will be described below. The compound having reversibility may be used to form a proper optical device through such a process.

The present application is directed to providing an optical panel. For example, the optical panel may include at least two optical devices as described above. In the optical panel, the two optical devices may be disposed to face each other, and may be disposed so that relative positions of the optical devices disposed to face each other can be shifted.

In such disposition, transmissivity or a polarization state of light may be adjusted by shifting the relative positions of the optical devices.

For example, when the optical layer of the optical device is a polarizing layer, and the optical device is disposed so that the light absorption axes of the optical layer are perpendicular to each other, transmissivity of the optical panel may be adjusted to the minimum extent. When the optical device is disposed so that the light absorption axes of the optical layer are parallel with each other, the transmissivity of the optical panel may be adjusted to the maximum extent. Also, when the optical device is disposed so that an angle formed by the light absorption axes is greater than 0 degrees and less than 90 degrees, a predetermined level of transmissivity between the minimum and maximum transmissivities may be realized. Also, when the optical layer of the optical device is a phase delay layer, a polarization state and transmissivity of transmitted light may be adjusted by adjusting the relationship of the optical axes as described above. FIG. 4 shows one example in which an optical device 30 is disposed so that the optical axes or light absorption axes of the optical device are perpendicular to each other, FIG. 5 shows one example in which an optical device 30 is disposed so that the optical axes or light absorption axes of the optical device are parallel with each other, and FIG. 6 shows one example in which an optical device 30 is disposed so that an angle formed by the optical axes or light absorption axes of the optical device is greater than 0 degrees and less than 90 degrees.

In a configuration of the optical panel, a method of disposing optical devices to face each other so that the spacing between the optical devices and relative positions of the optical device can be shifted is not particularly limited.

The present application is directed to providing a polarizing mask. The polarizing mask according to the present application may be, for example, used during manufacture of the optical device, more particularly, during exposure of the alignment film so as to manufacture the optical device.

The polarizing mask may include polarization lines including a plurality of polarization regions which are disposed adjacent to each other in a predetermined direction (hereinafter referred to as a first direction). The polarization lines may be disposed adjacent to each other in a direction (hereinafter referred to as a second direction) perpendicular to the first direction. As such, the term "perpendicular" refers to a substantially vertical/perpendicular state. For example, an angle range of approximately 70 degrees to 120 degrees, approximately 80 degrees to 100 degrees, or approximately 85 degrees to 95 degrees may also fall within the scope of the substantially vertical/perpendicular state.

FIG. 7 is a schematic diagram showing the polarizing mask, as viewed from above. In FIG. 7, a vertical direction represents a first direction, and a horizontal direction represents a second direction. As shown in FIG. 7, the first polarization regions 1011, 1012, 1013, 1014 and 1015 disposed adjacent to each other in the first direction are combined to form a first polarization line 101, and second to fifth polarization lines 102, 103, 104 and 105 formed in the same manner as in the first polarization line 101 are disposed adjacent in a second direction.

Among the plurality of polarization lines included in the polarizing mask, at least one polarization line may include polarization regions having different transmission axis directions. For example, the angles of the transmission axes formed in the respective polarization regions 1011 to 1015, 2011 to 2015, 3011 to 3015, 4011 to 4015, and 5011 to 5015 of the polarizing mask as shown in FIG. 7 are shown in FIG. 8 (the numbers in the respective polarization regions shown in FIG. 8). Referring to the angles of the transmission axes of the respective polarization regions of the polarizing mask in the present application, the angles may mean angles measured in one of clockwise and counterclockwise directions with respect to 0 degrees which is set as an angle of one of the polarization regions of the polarizing mask.

Referring to FIG. 8, among the first to fifth polarization lines 101 to 105, the second to fourth polarization lines 102 to 104 include at least two polarization regions, which have different transmission axis directions.

In the polarizing mask, at least one polarization line may have a first polarization region having a transmission axis formed in a predetermined direction (hereinafter referred to as a first direction), and a second polarization region having a transmission axis formed in a second direction different from the first direction. The first and second polarization regions may be disposed adjacent to each other. For example, referring to FIGS. 7 and 8, the second polarization line 102 has a transmission axis in which the second polarization region 1022 and the third polarization region 1023 are formed in different directions and disposed adjacent to each other.

In this case, an angle formed by a transmission axis direction (a first direction) of the first polarization region and a transmission axis direction (a second direction) of the second polarization region may be, for example, in a range of approximately 15 degrees to 30 degrees, approximately 16 degrees to 29 degrees, approximately 17 degrees to 28 degrees, approximately 18 degrees to 27 degrees, approximately 19 degrees to 26 degrees, approximately 20 degrees to 25 degrees, or approximately 21 degree to 24 degrees.

In the polarizing mask, at least two of the polarization lines may have different average transmission axes. In the present application, the term "average transmission axis" may refer to an average value of angles of the transmission axes of all the polarization regions included in the polarization line. For example, referring to FIG. 8, the average transmission axis of the first polarization line is 0 degrees, the average transmission axis of the second polarization line is 4.5 degrees, the average transmission axis of the third polarization line is 9 degrees, the average transmission axis of the fourth polarization line is 13.5 degrees, and the average transmission axis of the fifth polarization line is 22.5 degrees.

The polarizing mask may include a first polarization line having an average transmission axis formed in a predetermined direction (hereinafter referred to as a first direction), and a second polarization line having an average transmission axis formed in a second direction different from the first direction. The first and second polarization lines may be disposed adjacent to each other.

For example, FIG. 8 shows an example in which the first to fifth polarization lines 101 to 105 have different average transmission axes of 0 degrees, 4.5 degrees, 9 degrees, 13.5 degrees and 22.5 degrees and are disposed adjacent in a horizontal direction.

In the example shown in FIG. 8, the angle formed between a direction (a first direction) of the average transmission axis of the first polarization line and a direction (a second direction) of the average transmission axis of the second polarization line may be, for example, in a range of approximately 1 degree to 20 degrees. The angle may be greater than or equal to approximately 2 degrees, approximately 3 degrees, or approximately 3.5 degrees according to another illustrative embodiment. Also, the angle may be less than or equal to approximately 19 degrees, approximately 18 degrees, approximately 17 degrees, approximately 16 degrees, or approximately 15 degrees according to another illustrative embodiment.

The polarizing mask may include an increase or decrease region in which the average transmission axis of the polarization lines increases or decreases in a second direction.

For example, referring to the illustrative polarizing mask shown in FIG. 9, the mask includes an increase region formed of polarization lines A to D in which the average transmission axis increases to 72 degrees, 76.5 degrees, 81 degree and 90 degrees from the left and right of FIG. 9, and a decrease region formed of polarization lines D to H in which the average transmission axis decreases to 90 degrees, 85.5 degrees, 81 degree, 76.5 degrees and 67.5 degrees from the left and right of FIG. 9.

An increase or decrease rate in such an increase or decrease region may be determined according to the following Equation 7.

$$R=Q/N \qquad \text{[Equation 7]}$$

In Equation 7, R represents an increase or decrease rate, Q represents an angle formed between an average transmission axis of polarization lines whose average transmission axis starts to increase or decrease in the increase or decrease region disposed in a second direction and an average transmission axis of polarization lines in which an increase or decrease in the average transmission axis is stopped, and N represents the number of the polarization lines included in the increase or decrease region.

When the increase or decrease rate is defined according to Equation 7, the increase or decrease in the average transmission axis of the increase or decrease region may be determined based on one of clockwise and counterclockwise directions.

For example, an increase rate R in the increase region composed of the polarization lines A to D and a decrease rate R in the decrease region composed of the polarization lines D to H are 4.5, as shown in FIG. 9.

In the polarizing mask, the increase rate R or decrease rate R may be, for example, in a range of approximately 1 to 10. According to another illustrative embodiment, the increase rate R or decrease rate R may be greater than or equal to approximately 2, 3, 4, or 4.5. According to another illustrative embodiment, the increase rate R or decrease rate R may also be less than or equal to approximately 9, 8, 7, 6, or approximately 5.5.

In Equation 7, Q may be in a range of approximately 70 degrees to 120 degrees, approximately 80 degrees to 100 degrees, or approximately 85 degrees to 95 degrees. In Equation 7, N may also be in a range of approximately 5 to 30. According to another illustrative embodiment, N may be in a range of approximately 7 to 28, 9 to 26, 11 to 24, or 13 to 22.

When the polarizing mask configured thus is used, it is possible to form an alignment film which may be used to form the optical layer as described above.

In the polarizing mask, the width (a value measured in a second direction) and length (a value measured in a first direction) of the polarization line are not particularly limited, and may be determined according to desired applications. For example, the width of the polarization line may be in a range of approximately 1 mm to 20 mm. Also, the length of the polarization line may be, for example, in a range of approximately 30 mm to 70 mm.

Also, the number of the polarization regions included in each of the polarization lines of the polarizing mask is not particularly limited. For example, approximately 2 to 10 polarization regions may be properly selected in consideration of desired alignment efficiency, and the like.

As described above, a method of manufacturing a polarizing mask is not particularly limited. For example, a plurality of poly(vinyl alcohol) (PVA) polarizing plates or wire grid polarizers (WGP) may be combined to manufacture the polarizing mask.

According to one illustrative embodiment, the mask may be maintained in a curved state. For example, when a surface of an irradiated object is maintained in a curved state in a light exposure process using the mask, it is necessary to maintain the polarizing mask in a curved state.

For example, examples of the irradiated object whose surface is maintained in a curved state may include an irradiated object irradiated with light during a roll-to-roll process. In the present application, the term "roll-to-roll process" encompasses all kinds of processes including irradiating an irradiated object with light while continuously transferring the irradiated object using a roll such as a guide roll, a transfer roll, or a winding roll. In the roll-to-roll process, a method of irradiating an irradiated object with light may be, for example, performed in a state in which the irradiated object is wound into a roll. When the irradiated object is irradiated with light using this method, the irradiated object may be effectively irradiated with light in a state in which the irradiated object is fixed.

FIG. 10 is a diagram illustrating a process of irradiating an irradiated object 50 with light by means of a polarizing mask 40 using a roll-to-roll process. As shown in FIG. 10, the irradiated object 50 is wound into a roll 60 so that a surface of the irradiated object 50 is maintained in a curved state, and thus may be irradiated with light in this curved state.

The shape of the mask whose surface is maintained in a curved state, for example, a radius of curvature of the mask, is not particularly limited, and may be selected to irradiate the irradiated object with proper light. For example, the radius of curvature of the mask may be adjusted to correspond to a radius of curvature of the irradiated object whose surface is maintained in a curved state. For example, when the mask is maintained in a curved state, a transmissible support structure of the mask may have a radius of curvature of approximately 10 mm to 500 mm.

Also, the present application is directed to providing an apparatus for irradiating an irradiated object with light or an apparatus for manufacturing an optical device. Here, the apparatus includes the polarizing mask. The optical device manufactured by the manufacturing apparatus may be the above-described optical device.

For example, the manufacturing apparatus may include a holding unit installed to hold the polarizing mask and the irradiated object. In the apparatus, the polarizing mask and the holding unit may be configured so that a relative position of the irradiated object with respect to the polarizing mask can move in the first direction, that is, a length direction of a polarization line.

In the apparatus, the kind of the holding unit is not particularly limited, and may include all kinds of devices designed to stably maintain the irradiated object while the irradiated object is being irradiated with light.

The holding unit may be a device configured to hold an irradiated object in a state in which a surface of the irradiated object is maintained in a curved state. Examples of such a device may include a roll used in the above-described roll-to-roll process, but the present application is not limited thereto. When the device configured to hold an irradiated object may hold the irradiated object in a state in which a surface of the irradiated object is maintained in a curved state, the mask may also be included in the device in a state in which the mask is maintained in a curved state. In this case, the mask may be included in the device so that a curved shape of the mask can correspond to a curved surface of the device configured to hold an irradiated object.

The device may further include a light source configured to irradiate the polarizing mask with light. The light source may be used without particular limitation as long as it can be used to irradiate an irradiated object with light in a direction of the polarizing mask. For example, when alignment of the optical alignment film or light exposure of a photoresist by means of the polarizing mask is performed, a high-pressure mercury UV lamp, a metal halide lamp or a gallium UV lamp may be used as the light source serving as a light source capable of radiating ultraviolet (UV) rays.

Also, the device may further include at least one light concentrating plate to adjust the quantity of light radiated from the light source. For example, the light concentrating plate may be included inside the device so that light radiated from the light source can be incident on and concentrated on the light concentrating plate and the polarizing mask can be irradiated with the concentrated light. Light concentrating plates widely used in the related art may be used as the light concentrating plate as long as they can be formed to concentrate light radiated from the light source. Examples of the light concentrating plate may include a lenticular lens layer, and the like.

When the device has the configuration as described above, the device may, for example, include a light source, a light concentrating plate, a polarizing mask and a holding unit, which are disposed in sequential order. Therefore, the light radiated from the light source may be first incident on and concentrated on the light concentrating plate, and may then be incident on the polarizing mask again, and may pass through the polarizing mask so that a surface of an irradiated object can be irradiated with light.

The present application is directed to providing a light radiating method or a method of manufacturing an optical device. According to one illustrative embodiment, the method may be performed using the above-described device.

For example, the method may include disposing an alignment film, for example, an optical alignment film, below the polarizing mask and irradiating the alignment film with light by means of the polarizing mask. The operations of the method may be, for example, performed by shifting a relative position of the alignment film with respect to the polarizing mask in a first direction (i.e., a length direction of a polarization line).

An alignment film capable of realizing the above-described optical device through these operations may be provided. For example, the alignment film will be described with reference to FIG. 9. When a lower portion of the polarizing mask having a pattern as shown in FIG. 9 is exposed to light while shifting a proper alignment film in a first direction (a vertical direction in the drawing), for example, a region of the alignment film passing through the polarization line A are sequentially exposed to linearly polarized light polarized at angles of 67.5 degrees, 67.5 degrees, 90 degrees, 67.5 degrees and 67.5 degrees. Regions of the alignment film passing through the polarization lines B to H in the same way are sequentially exposed to linearly polarized light polarized at angles corresponding to transmission axis directions of the respective polarization regions. As described above, when the polarization lines have different average transmission axes, the polarization lines are disposed under predetermined rules. Therefore, the region of the alignment film passing through a lower portion of each polarization line has an orientation direction shifted according to the disposition and average transmission axis of the polarization regions of each polarization line. As a result, the optical axis or light absorption axis of the optical layer formed on the polarization regions may be realized by the above-described configuration.

In this process, a shift rate of a relative position between the alignment film and the polarizing mask in a first direction is not limited as long as proper alignment can be achieved. For example, the shift rate may be determined to be approximately 5 m/min or less. According to another illustrative embodiment, the shift rate may be less than or equal to approximately 4 m/min, or approximately 3 m/min. Also, the shift rate may be, for example, greater than or equal to approximately 0.5 m/min, or approximately 1 m/min.

As described above, the light exposure process may be performed in a state in which a surface of the alignment film that is an irradiated object is maintained in a curved state.

The optical device may be manufactured by forming an optical layer on the alignment film formed as described above. A method of forming an optical layer is not particularly limited. For example, the optical layer may be formed by forming a layer including the above-described polymerizable liquid crystal compound and/or dichroic dye on an alignment film, aligning the layer and providing the layer with energy using a method such as irradiation with light or application of heat.

As such, a method of forming a layer including the liquid crystal compound and/or dichroic dye, and aligning the layer, that is, orienting the layer according to an alignment pattern of the alignment film arranged below the layer, or a method of polymerizing an oriented liquid crystal compound is not particularly limited. For example, the alignment may be performed using a method of maintaining a layer at a proper temperature at which the layer can be oriented according to the kind of the liquid crystal compound and/or dichroic dye. Also, the polymerization may be performed using a method such as irradiation with light or application of heat, in which proper crosslinking or polymerization may be induced according to the kind of the liquid crystal compound.

Effects

According to the present application, a polarizing mask capable of being used to manufacture an optical device including an optical layer whose optical axes or light absorption axes are continuously shifted is provided. For example, the optical device manufactured according to the present application can be used to adjust characteristics of light in electronic devices such as display devices, or can be used for various applications requiring a continuous change in an optical axis or light absorption axis, including use of windows or shades of buildings or automobiles.

BRIEF DESCRIPTION OF THE DRAWINGS

FIGS. 7 to 9 are diagrams showing a polarizing mask according to one illustrative embodiment of the present application.

FIGS. 11 and 12 are diagrams for describing a polarizing mask used in Examples.

ILLUSTRATIVE EMBODIMENTS

Hereinafter, referring to Examples, the above will be described in detail. However, the present application is not limited to the embodiments disclosed below.

Example 1

Manufacture of Polarizing Mask

A conventional wire grid polarizer (WGP) was cut with transverse and longitudinal lengths of 10 mm to prepare WGP pieces for forming a polarization region. Thereafter, the five WGP pieces (polarization regions) were attached to form one polarization line, thereby manufacturing a polarizing mask. In this case, disposition of the transmission axes of the polarization regions of the polarizing mask was set as shown in FIGS. 11 and 12. The numbers listed in FIGS. 11 and 12 represent angles of the transmission axes of the respective regions. That is, referring to FIG. 11, the five WGP pieces were disposed on the uppermost region so as to have a transmission axis of 0 degrees, and 16 polarization lines were disposed below the uppermost region. The polarizing mask was finally manufactured by attaching the top region of the mask shown in FIG. 11 to the bottom region of the mask shown in FIG. 12.

Formation of Alignment Film

An alignment film precursor was manufactured by dissolving a mixture in a toluene solvent so that an alignment compound had a solid concentration of 2% by weight. Here, the mixture was obtained by blending the alignment compound, polynorbornene, containing a cinnamate group as disclosed in Korean Patent No. 1064585 with a proper amount of a photoinitiator (Igacure 907). Thereafter, one surface of a poly(ethylene terephthalate) (PET) film was coated with the precursor, and dried at a proper temperature. The dried layer was then irradiated with ultraviolet rays (1,200 mJ/cm$^2$) from the top of the polarizing mask while moving the dried layer to pass through a lower region of the manufactured polarizing mask, thereby forming an alignment film. Referring to FIGS. 11 and 12, the movement of the alignment film as described above was achieved from the left to right of the drawings, and the movement rate was maintained at approximately 2.5 m/min.

Manufacture of Optical Device

Figure 1:
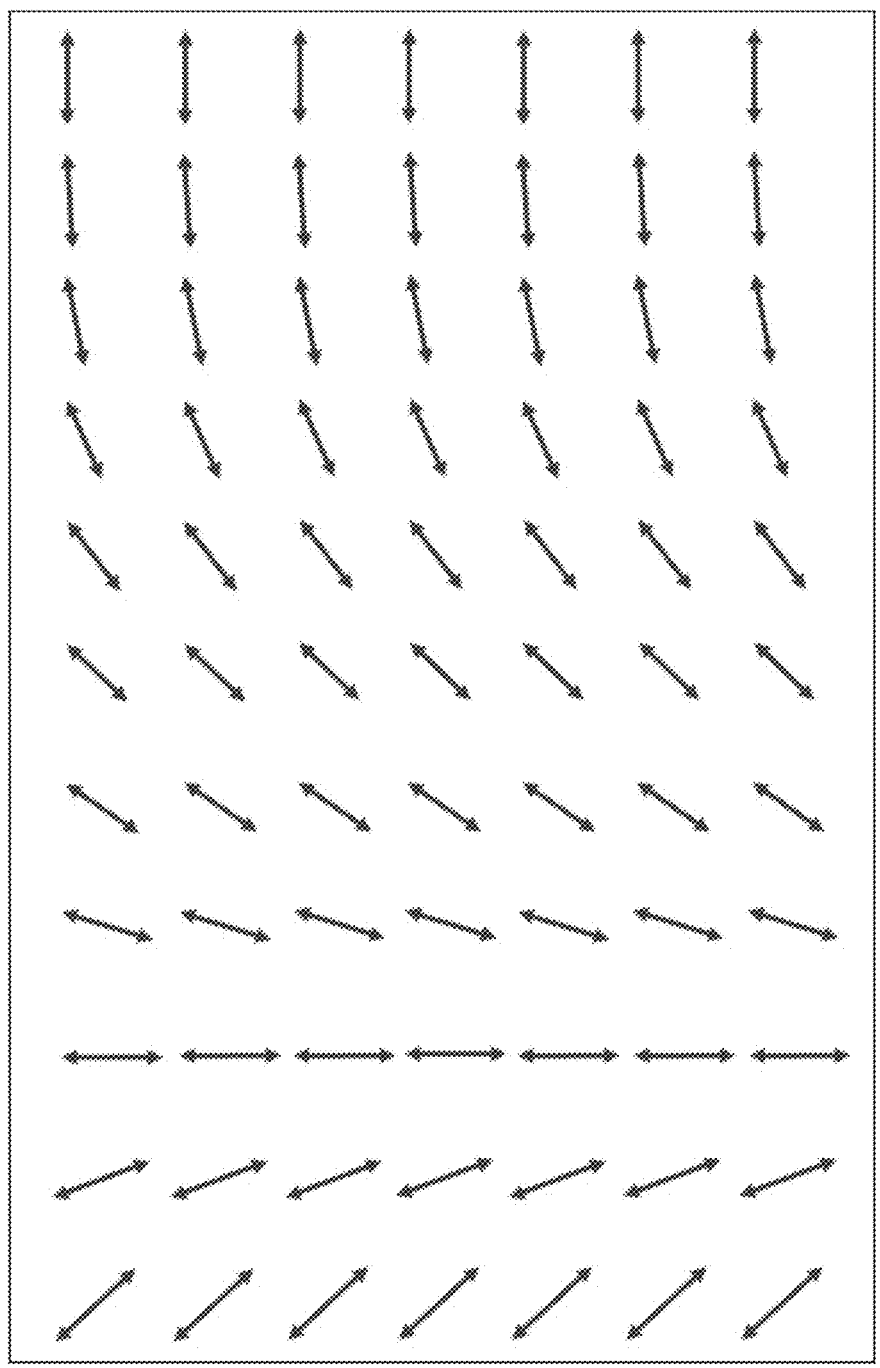
FIGS. 1 to 3 are conceptual diagrams showing an optical device according to one illustrative embodiment of the present application.
Figure 2:
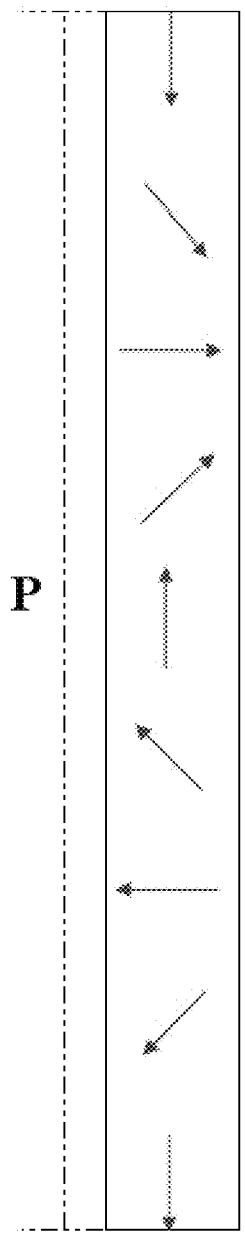
Figure 3:
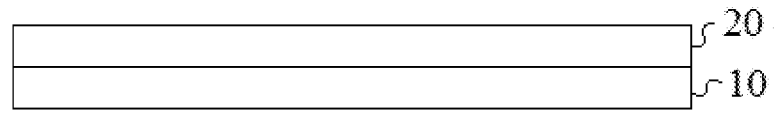
Figure 4:
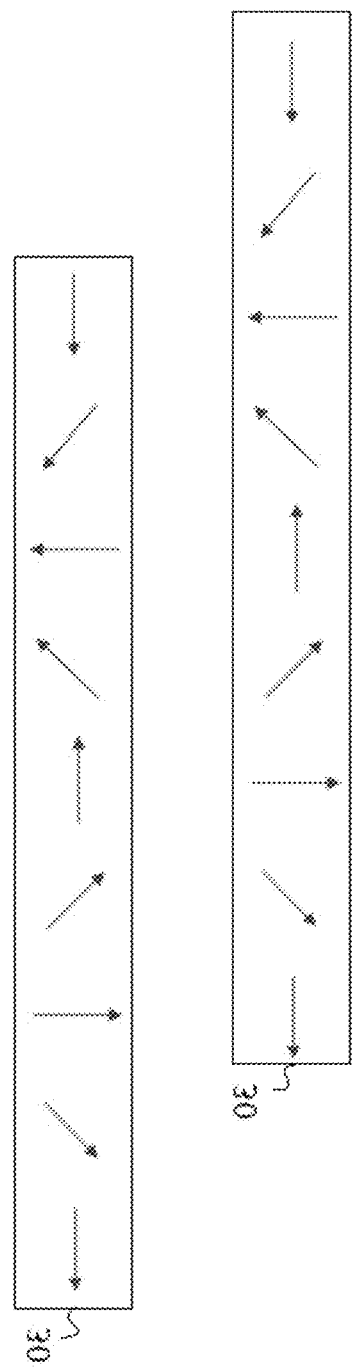
FIGS. 4 to 6 are conceptual diagrams showing the arrangement of the optical device according to one illustrative embodiment of the present application.
Figure 5:
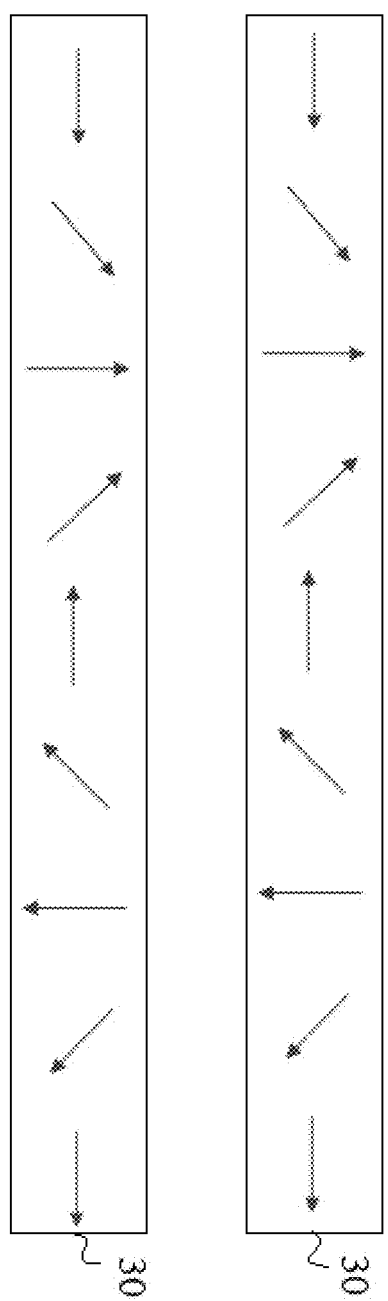
Figure 6:
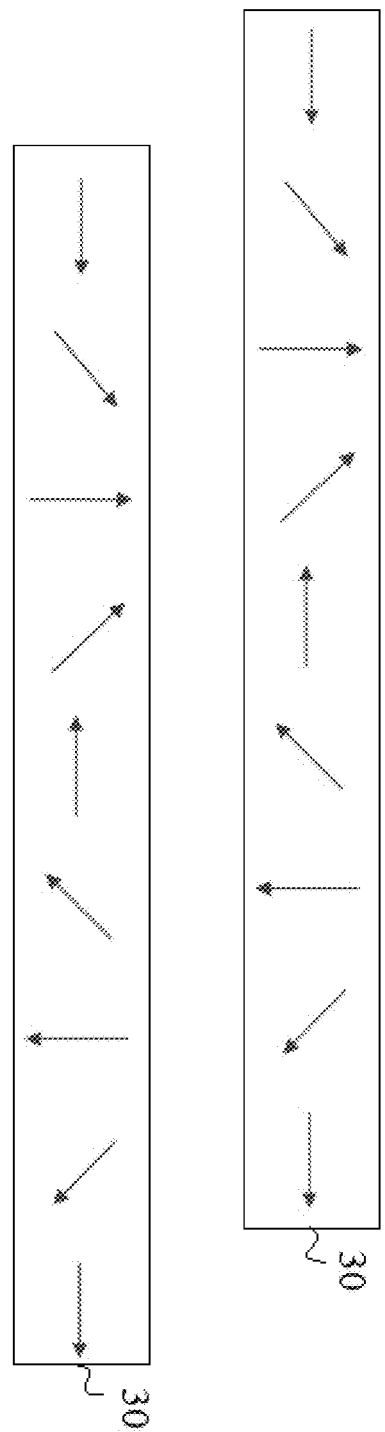
Figure 10:
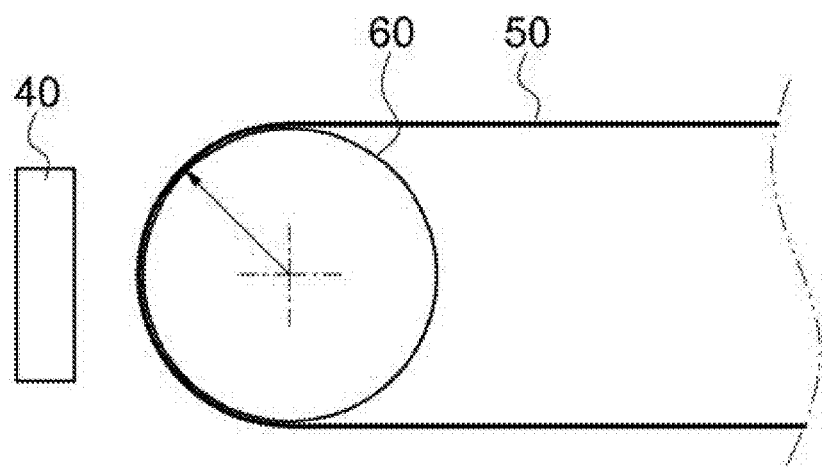
FIG. 10 is a diagram showing a configuration of the optical device according to one illustrative embodiment of the present application.
Figure 13:
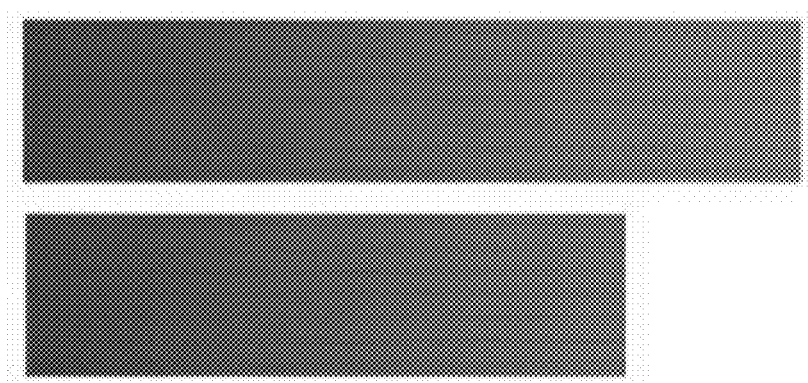
FIGS. 13 and 14 are diagrams illustrating a change in an optical axis of an optical layer prepared in Examples.
Figure 14:
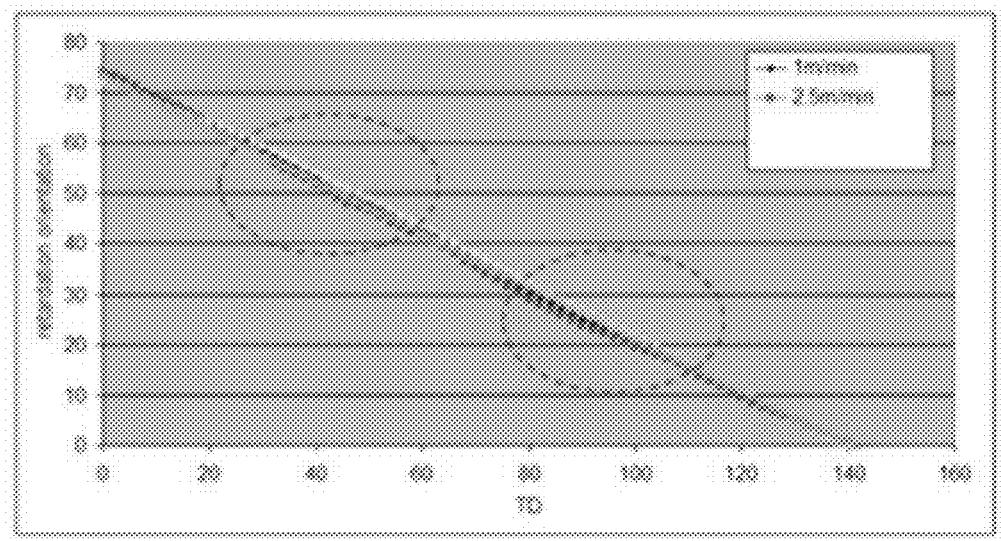

A coating solution obtained by blending a polymerizable liquid crystal compound (LC242 commercially available from BASF) with a proper amount of a photoinitiator (Igacure 907) was coated on an alignment film to a proper thickness, and irradiated with ultraviolet rays (30 mW/cm$^2$), in a state in which the resulting coating layer was aligned according to an alignment pattern of the alignment film formed below the coating layer, to form an optical layer, thereby manufacturing an optical device. FIG. 13 is a diagram showing the distribution of optical axes of the optical layer formed in this way, and FIG. 14 is a graph shown using a horizontal direction of the optical layer as the X axis (TD axis) and an angle of the optical axis (a slow axis) as the Y axis (retardation alignment). In FIG. 14, the unit of the Y axis is degrees (degrees), and the unit of the X axis is millimeters (mm) As shown in FIGS. 13 and 14, it could be seen that the optical layer in which no interfaces between the respective regions were observed and the optical axes were shifted regularly was formed.

Example 2

Upon irradiation with ultraviolet rays for forming an alignment film, an optical layer was manufactured in the same manner as in Example 1, thereby manufacturing an optical device, except that the movement rate of the alignment film was changed to approximately 1 m/min. FIG. 14 is a graph shown using a horizontal direction of the optical layer as the X axis and an angle of the optical axis (a slow axis) as the Y axis in combination with the results of Example 1. In the graph shown in FIG. 14, it was observed that the results of FIG. 14 almost overlapped the results of Example 1. From these facts, it could also be seen that the optical layer in which no interfaces between the respective regions were observed and the optical axes were shifted regularly was formed.

Example 3

An optical device was manufactured in the same manner as in Example 1, except that a coating solution obtained by blending an azo-based dichroic dye, which was aligned according to alignment of a polymerizable liquid crystal compound and had the maximum absorbance in a visual light region (400 nm to 800 nm), with a coating solution including the polymerizable liquid crystal compound was used herein. In such an optical device, an optical layer whose light absorption axis is continuously shifted by the dichroic dye in a manner similar to the distribution of optical axes in Example 1 was formed.

Example 4

An optical device was manufactured in the same manner as in Example 2, except that a coating solution obtained by blending an azo-based dichroic dye, which was aligned according to alignment of a polymerizable liquid crystal compound and had the maximum absorbance in a visual light region (400 nm to 800 nm), with a coating solution including the polymerizable liquid crystal compound was used herein. In such an optical device, an optical layer whose light absorption axis is continuously shifted by the dichroic dye in a manner similar to the distribution of optical axes in Example 2 was formed.

EXPLANATION OF THE MARKS

10: the base layer
20: the optical layer
30: the optical device
101, 102, 103, 104, 105, A, B, C, D, E, F, G, H: the polarization line
1011 to 1015, 2011 to 2015, 3011 to 3015, 4011 to 4015, 5011 to 5015: the polarization region
40: polarizing mask
50: the irradiated object
60: the holding unit

What is claimed is:

1. A method of manufacturing an optical device, comprising:
   disposing an optical alignment film below a polarizing mask; and
   irradiating the optical alignment film with light through the polarizing mask,
   wherein the polarizing mask comprises a plurality of polarization lines that include a plurality of polarization regions disposed adjacent to each other in a first direction and that are disposed adjacent to each other in a second direction perpendicular to the first direction, at least one of the polarization lines comprising polarization regions, of which transmission axes are different from each other, and at least two of the polarization lines having different average transmission axes from each other,
   wherein the polarizing mask comprises an increase or decrease region in which the average transmission axes of the polarization lines increases or decreases in the second direction,
   wherein an increase or decrease rate defined by the following Equation 7 is in a range from 1 to 10:

$$R=Q/N \qquad \text{[Equation 7]}$$

wherein the "R" represents an increase or decrease rate, the "Q" represents an angle formed between an average transmission axis of polarization lines whose average transmission axis is measured in degrees and starts to increase or decrease in the increase or decrease region in the second direction and an average transmission axis of polarization lines in which the increase or decrease in the average transmission axis is stopped, and the "N" is the number of the polarization lines comprised in the increase or decrease region,
   wherein irradiating is performed while shifting a relative position of the optical alignment film with respect to the polarizing mask in the first direction, and the shift occurs in a length direction of the polarizing line such that the same region of the irradiated optical alignment film is irradiated several times with different kinds of linearly polarized light.

2. The method of claim 1, wherein the polarization lines comprises a first polarization region, of which a transmission axis is formed in axis a first direction, and a second polarization region which is disposed adjacent to the first polarization region and, of which a transmission axis is formed in a second axis direction different from the first axis direction.

3. The method of claim 2, wherein an angle formed by the first axis direction and the second axis direction is in a range from 15 degrees to 30 degrees.

4. The method of claim 1, wherein the polarizing mask comprises a first polarization line, of which an average transmission axis is formed in a first axis direction, and a second polarization line which disposed adjacent to the first polarization line and, of which an average transmission axis is formed in a second axis direction different from the first axis direction.

5. The method of claim 4, wherein an angle formed by the first axis direction and the second axis direction is in a range from 1 degree to 20 degrees.

6. The method of claim 1, wherein the "Q" is in a range from 70 degrees to 120 degrees.

7. The method of claim 1, wherein the "N" is in a range of 7 to 28.

8. The method of claim 1, wherein irradiating is performed by a light source configured to emit linearly polarized light toward the polarizing mask.

9. The method of claim 1, wherein a shift rate of the relative position of the optical alignment film with respect to the polarizing mask is not more than 5 m/min.

10. The method of claim 1, further comprising: forming a layer comprising a polymerizable liquid crystal compound in the optical alignment film and polymerizing the polymerizable liquid crystal compound after the radiation with light.

11. The method of claim 1, further comprising: forming a layer comprising a polymerizable liquid crystal compound and a dichroic dye in the optical alignment film and polymerizing the polymerizable liquid crystal compound after the irradiation with light.

12. The method of claim 1, a surface of the polarizing mask is formed in a curved state.

13. The method of claim 1, wherein the optical alignment film is irradiated with light through the mask in a state in which a surface of the optical alignment film is maintained in a curved state.

* * * * *